US009188669B2

(12) United States Patent
Hino

(10) Patent No.: US 9,188,669 B2
(45) Date of Patent: Nov. 17, 2015

(54) TARGET FINDER, HIGH RESOLUTION PROCESSING DEVICE, AND HIGH RESOLUTION PROCESSING METHOD

(71) Applicant: FURUNO Electric Company Limited, Nishinomiya, Hyogo (JP)

(72) Inventor: Akihiro Hino, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 281 days.

(21) Appl. No.: 13/891,540

(22) Filed: May 10, 2013

(65) Prior Publication Data

US 2013/0300597 A1    Nov. 14, 2013

(30) Foreign Application Priority Data

May 11, 2012  (JP) .................. 2012-109030

(51) Int. Cl.
| | | |
|---|---|---|
| *G01S 13/04* | (2006.01) | |
| *G01S 13/06* | (2006.01) | |
| *G01S 7/292* | (2006.01) | |
| *G01S 7/32* | (2006.01) | |
| *G01S 13/42* | (2006.01) | |
| G01S 13/00 | (2006.01) | |
| G01S 7/00 | (2006.01) | |
| G01S 7/06 | (2006.01) | |

(52) U.S. Cl.
CPC ................. *G01S 13/06* (2013.01); *G01S 7/292* (2013.01); *G01S 7/32* (2013.01); *G01S 13/42* (2013.01); *G01S 7/06* (2013.01)

(58) Field of Classification Search
CPC ............... G01S 7/02; G01S 7/04; G01S 7/06; G01S 7/28; G01S 7/285; G01S 7/292; G01S 7/32; G01S 13/02; G01S 13/06; G01S 13/42; G01S 13/88; G01S 13/89; G01S 13/90; G01S 13/9035; G01S 13/04
USPC ......... 702/127, 189–199; 342/25 R–25 F, 27, 342/28, 89–97, 159, 175, 176, 179, 342/192–197, 104–109; 375/316, 346, 350, 375/130, 132; 704/200, 201, 226
See application file for complete search history.

(56) References Cited

U.S. PATENT DOCUMENTS 4,095,225 A * 6/1978 Erikmats ........................ 342/195
4,532,639 A * 7/1985 Price et al. ..................... 375/350

(Continued)

FOREIGN PATENT DOCUMENTS

JP    2002-311126 A    10/2002

*Primary Examiner* — Bernarr Gregory
(74) *Attorney, Agent, or Firm* — Global IP Counselors, LLP

(57) ABSTRACT

A high resolution processing device that is provided to a target finder for detecting a presence of a target, and that increases resolution of a received signal received by the target finder, includes a first change amount calculator, a second change amount calculator, a coefficient setting component, and an output signal production component. The first change amount calculator calculates as a first change amount an amount of change in the received signal received by the target finder per unit quantity in one direction of an angle direction and a distance direction. The second change amount calculator calculates as a second change amount an amount of change in the first change amount per unit quantity in the one direction. The coefficient setting component sets at least one coefficient based on the first change amount and the second change amount.

20 Claims, 14 Drawing Sheets

(56) References Cited

U.S. PATENT DOCUMENTS

| | | | | |
|---|---|---|---|---|
| 5,181,225 A | * | 1/1993 | Neeser et al. | 375/350 |
| 5,532,699 A | * | 7/1996 | Smith | 342/195 |
| 5,721,694 A | * | 2/1998 | Graupe | 702/191 |
| 5,726,656 A | * | 3/1998 | Frankot | 342/25 C |
| 6,249,544 B1 | * | 6/2001 | Azazzi et al. | 375/346 |
| 6,263,307 B1 | * | 7/2001 | Arslan et al. | 704/226 |
| 6,573,855 B1 | * | 6/2003 | Hayakawa et al. | 342/176 |
| 6,677,885 B1 | * | 1/2004 | Frankot | 342/25 R |
| 7,035,311 B2 | * | 4/2006 | Nohara et al. | 375/132 |
| 7,035,361 B2 | * | 4/2006 | Kim et al. | 375/350 |
| 7,038,617 B1 | * | 5/2006 | Ferrante | 342/159 |
| 7,421,017 B2 | * | 9/2008 | Takatsu | 375/350 |
| 7,456,780 B1 | * | 11/2008 | Garren | 342/25 A |
| 8,760,340 B2 | * | 6/2014 | Smith | 342/107 |

* cited by examiner

TARGET FINDER, HIGH RESOLUTION PROCESSING DEVICE, AND HIGH RESOLUTION PROCESSING METHOD

CROSS-REFERENCE TO RELATED APPLICATIONS

This application claims priority to Japanese Patent Application No. 2012-109030 filed on May 11, 2012. The entire disclosure of Japanese Patent Application No. 2012-109030 is hereby incorporated herein by reference.

BACKGROUND

1. Field of the Invention

The present invention relates to a high resolution processing device and a high resolution processing method for improving resolution in a received signal received by a radar or other such target finder.

2. Background Information

The inverse filtering discussed in Japanese Laid-Open Patent Application Publication No. 2002-311126 (Patent Citation 1) is an example of prior art that deals with improving resolution in a signal received by a radar or the like. This inverse filtering improves the resolution of a received signal by using a filter function produced from an antenna pattern to process a signal received by an antenna.

SUMMARY

When this inverse filtering is performed, however, a number of sets of data must be held in order to process a received signal with a filter function. If there is data in the distance direction, such as with a radar or other such target finder, a large-capacity memory is necessary. The S/N ratio generally deteriorates when inverse filtering is performed.

In view of this, it is an object of the present invention to provide a target finder and a high resolution processing device, method, and program for reducing deterioration in the S/N ratio without requiring a large-capacity memory.

The high resolution processing device that solves the above problem is configured to be provided to a target finder for detecting a presence of a target, and is configured to increase resolution of a received signal received by the target finder. The device of the present invention includes a first change amount calculator, a second change amount calculator, a coefficient setting component, and an output signal production component. The first change amount calculator is configured to calculate as a first change amount an amount of change in the received signal per unit quantity in one direction of an angle direction and a distance direction. The second change amount calculator is configured to calculate as a second change amount an amount of change in the first change amount per unit quantity in the one direction. The coefficient setting component is configured to set at least one coefficient based on the first change amount and the second change amount. The output signal production component is configured to produce an output signal by performing computation corresponding to multiplying the at least one coefficient by an anti-logarithmic value of the received signal.

The target finder that solves the above problem includes a signal receiver that is configured to receive a signal reflected from a target, an A/D converter that is configured to convert the received signal into a digital signal, a noise/interference eliminator that is configured to eliminate noise and interference from the digital signal, and the above-mentioned high resolution processing device that is configured to perform high resolution processing on the signal that has been processed by the noise/interference eliminator.

The high resolution processing method that solves the above problem increases resolution of a received signal received by a target finder for detecting a presence of a target, and includes the steps of calculating as a first change amount an amount of change in the received signal per unit quantity in one direction of an angle direction and a distance direction, calculating as a second change amount an amount of change in the first change amount per unit quantity in the one direction, setting at least one coefficient based on the first change amount and the second change amount, and producing an output signal by multiplying the at least one coefficient by an anti-logarithmic value of the received signal.

The present invention allows high resolution processing that reduces deterioration in the S/N ratio to be performed without requiring a large-capacity memory.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

The target finder pertaining to a first embodiment of the present invention will be described through reference to the drawings. In this embodiment, a radar device will be described as an example of a target finder.

Figure 1:
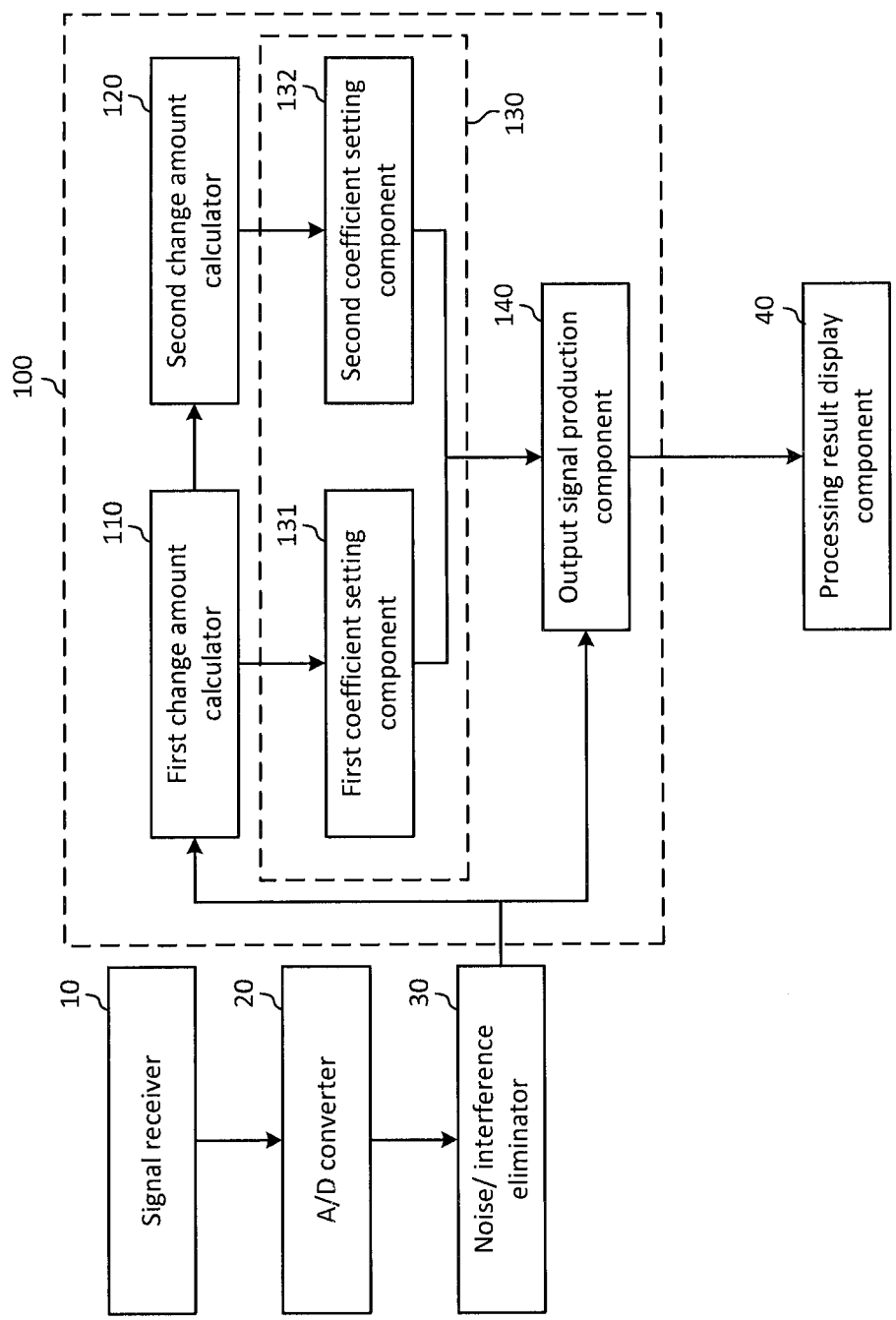
FIG. 1 is a simplified block diagram of the configuration of a radar device equipped with the high resolution processing device pertaining to a first embodiment of the present invention.

FIG. 1 is a simplified block diagram of the configuration of a radar device equipped with the high resolution processing device pertaining to this embodiment. This radar device includes a signal receiver 10, an A/D converter 20, a noise/interference eliminator 30, a high resolution processing device 100, and a processing result display component 40. The high resolution processing device 100 includes a coefficient setting component 130 and an output signal production component 140. The coefficient setting component 130 includes a first coefficient setting component 131 and a second coefficient setting component 132.

The signal receiver 10 uses an antenna or the like to receive radar signals reflected from a target.

The A/D converter 20 converts analog signals received by the signal receiver 10 into digital signals.

The noise/interference eliminator 30 eliminates clutter and other such noise, as well as other interference with the radar signal, from this digital signal. Conventional noise/interference elimination technology can be used for this interference processing.

The high resolution processing device 100 performs high resolution processing that suppresses side lobes and tailing of the main lobe in the received signal processed by the noise/interference eliminator 30.

The first change amount calculator 110 calculates as a first change amount the amount of change in the received signal per unit quantity in either an angle direction or a distance direction. More specifically, the first change amount calculator 110 holds enough data for two consecutive signals obtained by sending a pulse wave from an antenna and receiving the reflected wave. The first change amount calculator 110 then subjects the received signal processed by the noise/interference eliminator 30 to first-order differentiation in either the angle direction or the distance direction.

A second change amount calculator 120 calculates as a second change amount the amount of change in the first change amount per unit quantity in the direction used by the first change amount calculator 110 as a reference in calculating the first change amount. More specifically, the second change amount calculator 120 holds two consecutive first-order differentials processed by the first change amount calculator 110. The second change amount calculator 120 calculates a second-order differential based on these two consecutive first-order differentials.

The coefficient setting component 130 sets at least one coefficient based on the first change amount and the second change amount. More specifically, the first coefficient setting component 131 and the second coefficient setting component 132 belonging to the coefficient setting component 130 perform the following operation.

The first coefficient setting component 131 sets a first coefficient by determining to which of a plurality of predetermined first classifications the first-order differential belongs.

The second coefficient setting component 132 sets a second coefficient by determining to which of a plurality of predetermined second classifications the second-order differential belongs.

The first classification and second classification here are predetermined according to the characteristics of the transmission pulse. More specifically, the first and second classifications are set to optimal values by matching them to the shape of the envelope of the transmission pulse, such as the slope at which the pulse is rising or falling. The first coefficient and second coefficient are utilized by the output signal production component 140. This will be discussed in detail below.

The output signal production component 140 produces an output signal by performing computation corresponding to multiplying at least one coefficient by the anti-logarithmic value of the received signal. More specifically, the output signal production component 140 produces an output signal by performing computation corresponding to multiplying the above-mentioned first coefficient and second coefficient by the received signal, and outputs the output signal thus produced to the processing result display component 40.

The processing result display component 40 displays the signal processed by the output signal production component 140 on a cathode ray tube (CRT) or the like.

Next, the operation of the high resolution processing device 100 of this embodiment will be described in detail through reference to FIG. 2. The description is premised on the fact that this radar device receives the signal pattern shown in FIG. 3 and performs high resolution processing in the angle direction. The signal pattern in FIG. 3 is an example of the received signal pattern of an antenna featuring Chebyshev weighting of 30 dB and 20 elements while a single target is present. With this reception pattern, there is a great deal of change in the shapes of side lobes near the main lobe or tailing of the main lobe.

Figure 2:
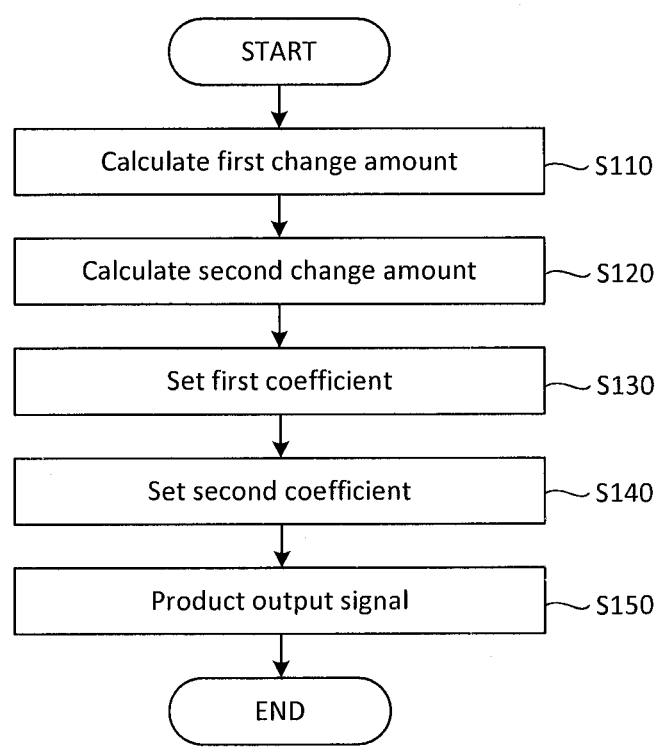
FIG. 2 is a flowchart showing the flow of processing in the high resolution processing device pertaining to the first embodiment.
Figure 3:
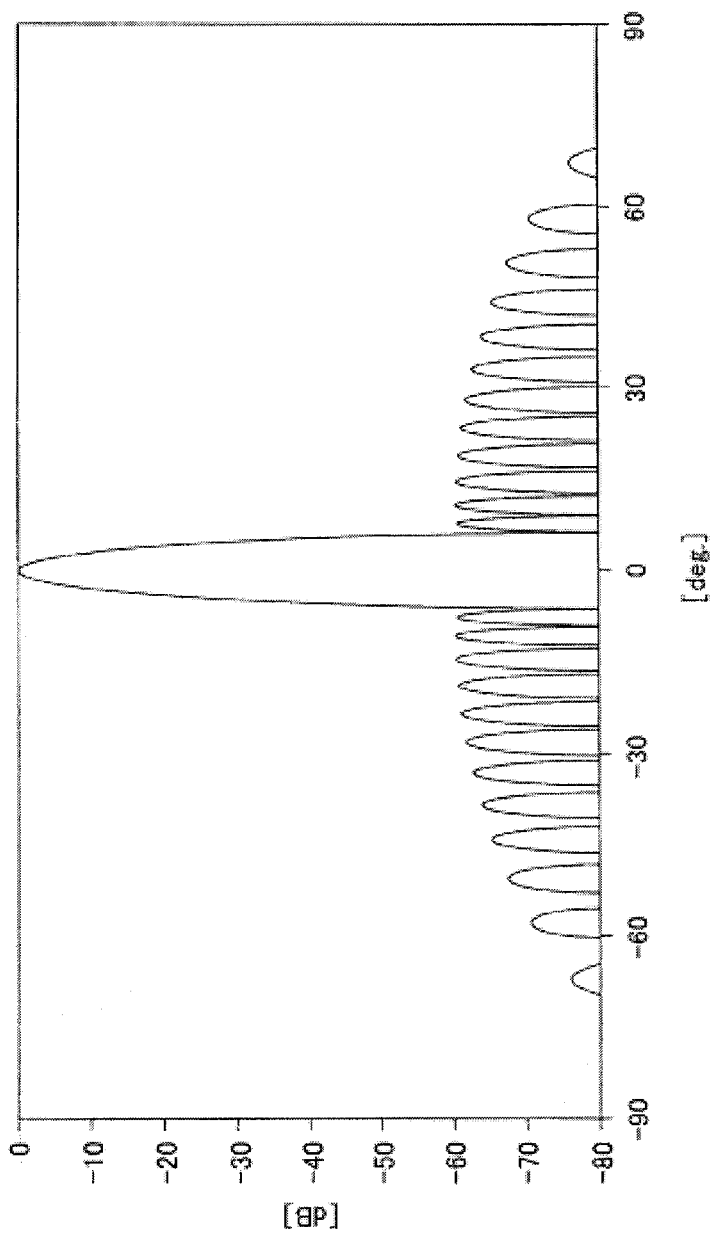
FIG. 3 is a diagram illustrating an example of a received signal pattern.

First, in step S110 in FIG. 2, the first change amount calculator 110 calculates the first change amount. More specifically, the first change amount calculator 110 subjects the above-mentioned signal to first-order differentiation. Here, the first change amount calculator 110 calculates a first-order differential as follows by utilizing data for two consecutive signals held in the first change amount calculator 110. If we let $A_{i-1}(L)$ be amplitude data at a specific distance L from the antenna out of the received signal for the reflected wave of the pulse wave sent the last time, $A_i(L)$ be amplitude data at the distance L from the antenna out of the received signal for the reflected wave of the pulse wave sent this time, and δθ be the difference between the antenna angle at which the reflected wave was received the last time and the antenna angle at which the reflected wave was received this time, then the one-time differential $d_\theta A_i(L)$ is found as in Formula (1).

[Formula (1)]

$$dA_i(L) = \frac{A_i(L) - A_{i-1}(L)}{\delta\theta} \qquad (1)$$

Figure 4:
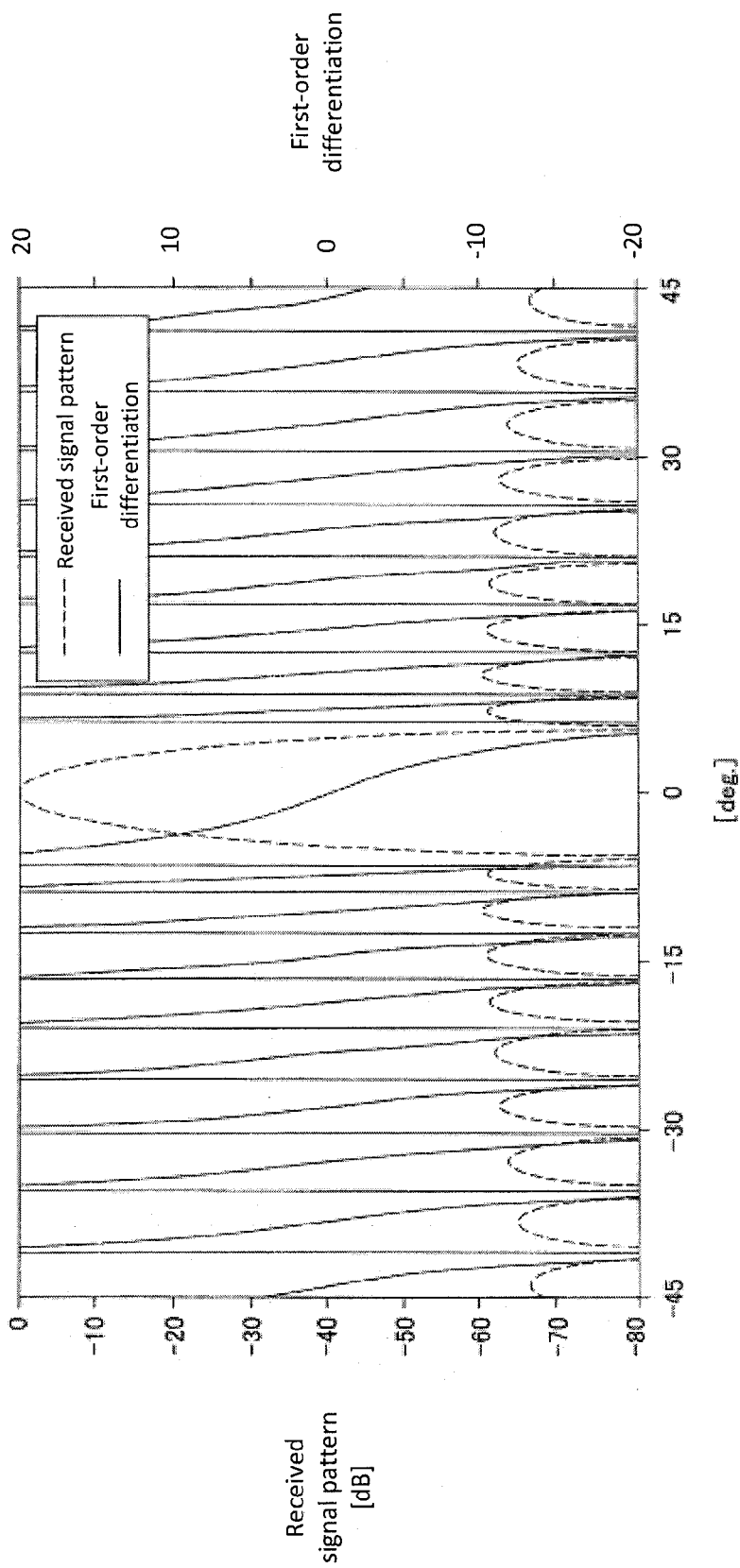
FIG. 4 is a diagram illustrating an example of a received signal pattern and a first-order differential.

FIG. 4 is an example of a first-order differential obtained in this manner. In FIG. 4, the solid lines are a first-order differential. Since a first-order differential expresses the displacement of a received signal pattern, the closer the first-order differential is to zero, the more gradual is the displacement of the signal. Therefore, the fact that a first-order differential is close to zero means that it is close to the peak of the signal. With the main lobe, the first-order differential changes gradually, whereas with the side lobes, the first-order differential changes sharply.

Next, in step S120 in FIG. 2, the second change amount calculator 120 calculates the second change amount. More specifically, the second change amount calculator 120 subjects the above-mentioned signal to second-order differentiation. Here, the second change amount calculator 120 calculates the second-order differential as follows by utilizing the two consecutive first-order differentials held by the second change amount calculator 120. If we let $d_\theta A_{i-1}(L)$ be the previous first-order differential related to amplitude data at a specific distance L from the antenna, $d_\theta A_i(L)$ be the current first-order differential related to amplitude data at the distance L from the antenna, and $\delta\theta$ be the difference between the antenna angle at which the reflected wave was received the last time and the antenna angle at which the reflected wave was received this time, then the two-time differential $d_\theta^2 A_i(L)$ is found as in Formula (2).

[Formula (2)]

$$d_\theta^2 A_i(L) = \frac{d_\theta A_i(L) - d_\theta A_{i-1}(L)}{\delta\theta} \tag{2}$$

Figure 5:
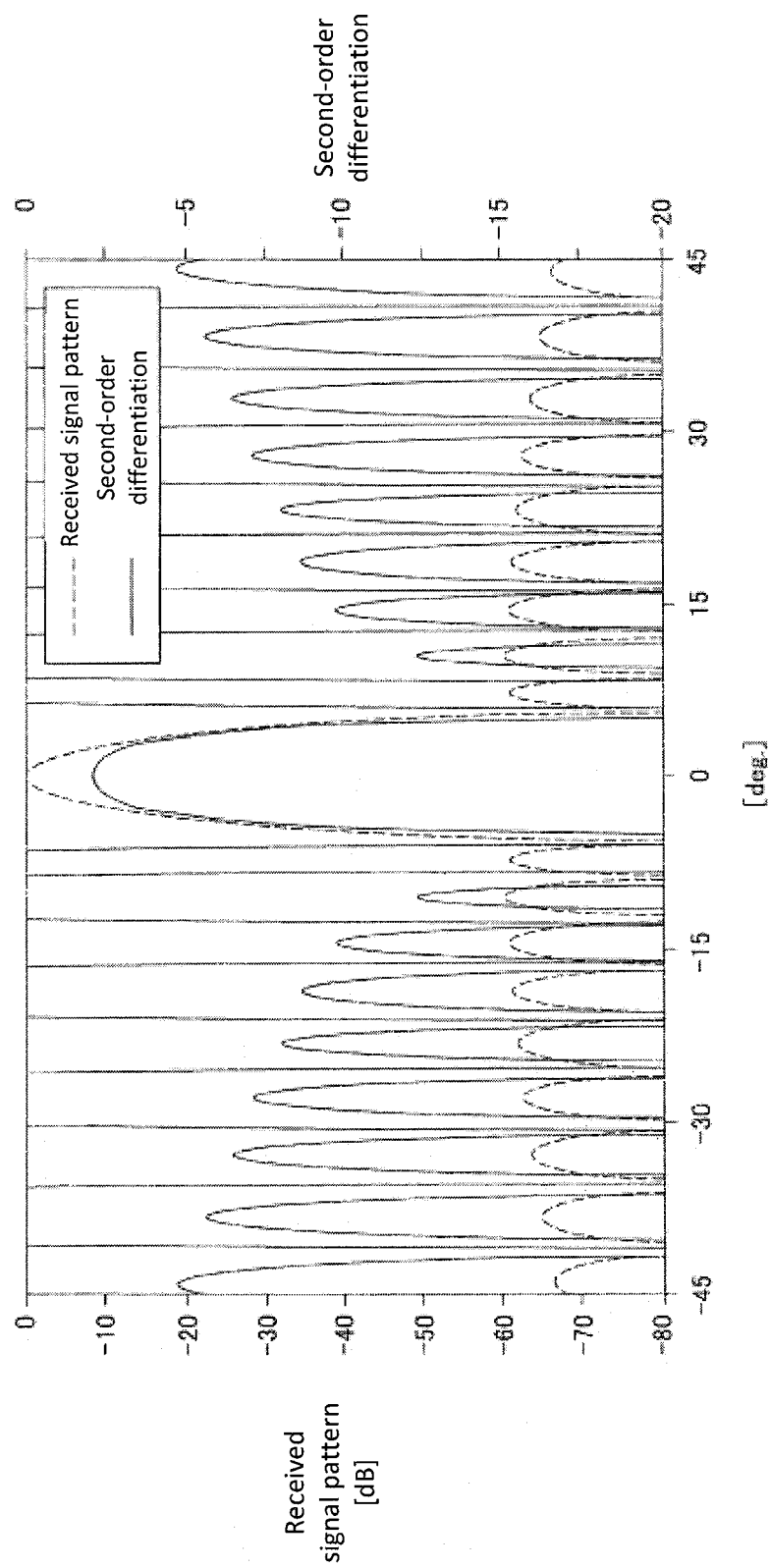
FIG. 5 is a diagram illustrating an example of a received signal pattern and a second-order differential.

FIG. 5 is an example of the second-order differential obtained in this manner. In FIG. 5, the solid lines are a second-order differential. A second-order differential expresses the amount of change in the displacement of a received signal pattern. With the main lobe, the first-order differential changes gradually as shown in FIG. 4, so the second-order differential is a value close to zero, as shown in FIG. 5. Meanwhile, with the side lobes, the first-order differential changes sharply, so the second-order differential is a value that is farther from zero.

In step S130 in FIG. 2, the first coefficient setting component 131 sets the first coefficient according to which of a predetermined plurality of first classifications the first-order differential belongs. Here, the above-mentioned knowledge is utilized by the first coefficient setting component 131 to set the first classifications and the first coefficients as follows in order to suppress side lobes and tailing of the main lobe.

First, taking advantage of the fact that higher resolution is achieved if signals that are not near the peak are suppressed, the first coefficient setting component 131 sets a lower value as the first coefficient the farther away the first-order differential is from zero. To put this the other way, the closer the first-order differential is to zero, the higher the value that the first coefficient setting component 131 sets as the first coefficient. Also, to prevent a decrease in S/N ratio before and after processing, the first coefficient setting component 131 sets the first coefficient to 1 when the first-order differential is in a region close to zero (that is, a region close to the peak of the signal).

When the first coefficients and first classifications are established as above, the first coefficient is found as follows, for example. If we let $P_i(L)$ be the first coefficient corresponding to the first-order differential $d_\theta A_i(L)$, then $P_i(L)$ is found as in Formula (3).

[Formula (3)]

$$P_i(L) = \begin{cases} 1(|d_\theta A_i(L)| < 1) \\ 0.95(1 \le |d_\theta A_i(L)| < 2) \\ 0.81(2 \le |d_\theta A_i(L)| < 4) \\ 0.59(4 \le |d_\theta A_i(L)| < 8) \\ 0.31(8 \le |d_\theta A_i(L)| < 16) \\ 0(16 \le |d_\theta A_i(L)|) \end{cases} \tag{3}$$

In Formula (3), it can be seen that the coefficient is at its maximum value 1 in the area of the main lobe ($|d_\theta A_i(L)|<1$), and the coefficient is at its minimum value in the area of a side lobe or noise ($16 \le |d_\theta A_i(L)|$).

In step S140, the second coefficient setting component 132 sets the second coefficient according to which of a predetermined plurality of second classifications the second-order differential belongs. Here, the above-mentioned knowledge is utilized by the second coefficient setting component 132 to set the second classifications and the second coefficients as follows in order to suppress side lobes and tailing of the main lobe.

At the main lobe, the second-order differential is a value that is closer to zero, whereas with the side lobes and noise, the second-order differential is a value that is farther away from zero, so when the second-order differential is close to zero, the second coefficient setting component 132 sets the second coefficient to 1. Conversely, when the second-order differential is farther away from zero, the second coefficient setting component 132 sets the second coefficient to zero.

When the second coefficients and second classifications are established as above, the second coefficient is found as follows, for example. If we let $Q_i(L)$ be the second coefficient corresponding to the second-order differential $d_\theta^2 A_i(L)$, then $Q_i(L)$ is found as in Formula (4).

[Formula (4)]

$$Q_i(L) = \begin{cases} 0(1 < d_\theta^2 A_i(L)) \\ 1(-1 < d_\theta^2 A_i(L) \le 1) \\ 0.95(-2 < d_\theta^2 A_i(L) \le -1) \\ 0.81(-3 \le d_\theta^2 A_i(L) \le -2) \\ 0.59(-4 < d_\theta^2 A_i(L) \le -3) \\ 0.31(-5 < d_\theta^2 A_i(L) \le -4) \\ 0(d_\theta^2 A_i(L) \le -5) \end{cases} \tag{4}$$

In Formula (4), it can be seen that the coefficient is at its maximum value 1 in the area of the main lobe ($-1<d_\theta^2 A_i(L) \le 1$), and the coefficient is at its minimum value in the area of a side lobe or noise ($d_\theta^2 A_i(L) \le -5$, $1<d_\theta^2 A_i(L)$).

Finally, in step S150, the output signal production component 140 produces an output signal $OA_i(L)$ from the product of an input signal $A_{i-1}(L)$, a first coefficient $P_i(L)$, and a second coefficient $Q_i(L)$. $OA_i(L)$ is expressed as in Formula (5). Formula (5) is presumes that the input signal $A_{i-1}(L)$ is an anti-logarithmic value. If the input signal $A_{i-1}(L)$ is a logarithmic value, addition processing should be performed instead of Formula (5). If the input signal $A_{i-1}(L)$ is digital data, bit computation should be performed instead of Formula (5).

[Formula (5)]

$$OA_i(L) = A_{i-1}(L) \cdot P_i(L) \cdot Q_i(L) \tag{5}$$

Figure 6:
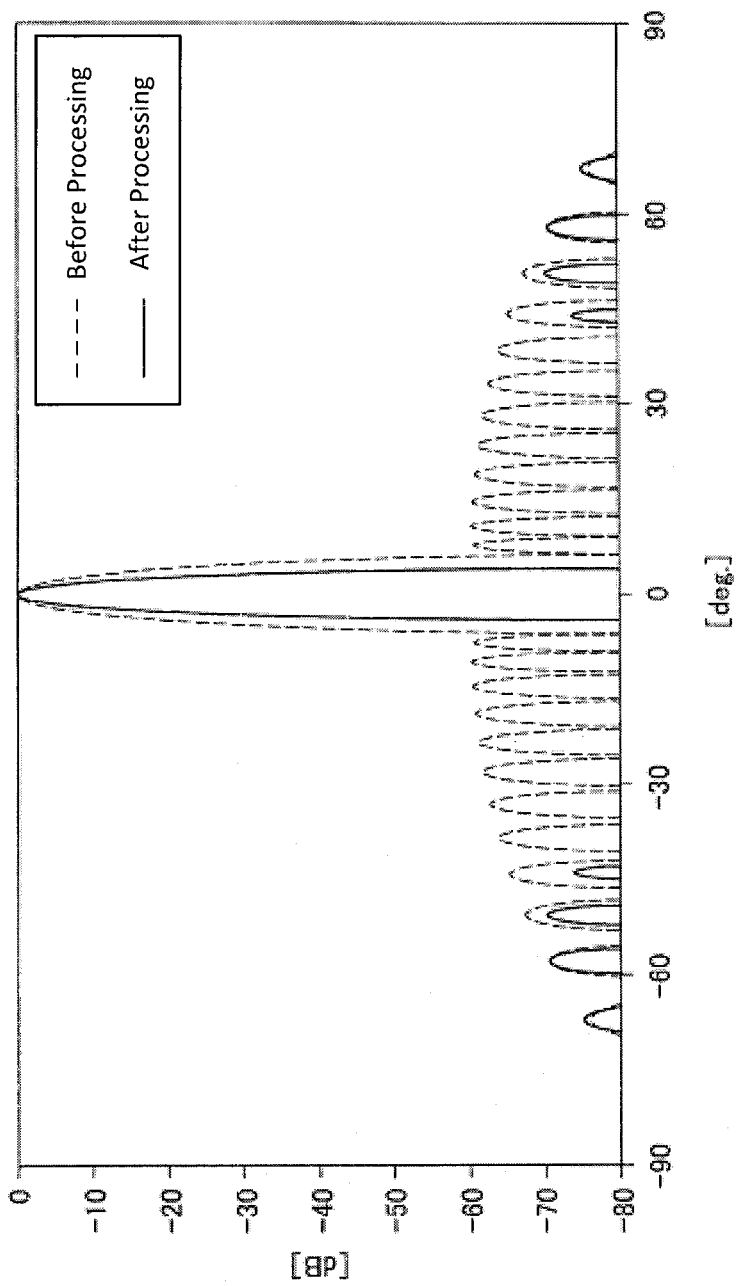
FIG. 6 is a diagram illustrating an example of the result of high resolution processing of the signal in FIG. 2.

FIG. 6 shows an example of the output signal $OA_i(L)$ that has undergone the above-mentioned high resolution processing. It can be seen from FIG. 6 that side lobes between approximately −45° and 45° are suppressed by a second-order differential coefficient. There is a suppression effect on tailing of the main lobe as well, and it can be seen that resolution is increased somewhat. As to side lobes that are distant from the main lobe, they cannot be completely suppressed since the displacement is similar to that of the main lobe. However, there is no adverse effect because the level of the original side lobes is low. As a result of the above processing, the 6 dB width of the received signal is reduced by 25% from 4.8° to 3.6°, and the 45 dB width is reduced by 30% from 11° to 7.8°.

The order of the processing in step S120 and the processing in step S130 can be reversed in the processing in FIG. 2. Specifically, the first coefficient setting component 131 can set the first coefficient first, and then the second change amount calculator 120 can calculate the second change amount.

The operation of the high resolution processing device 100 in this embodiment was described above for a case in which high resolution processing was performed in the angle direction. The following processing should be performed in the case of distance direction.

First, in step S110 in FIG. 2, if we let δd be the distance resolution of this radar, the first change amount calculator 110 calculates a first-order differential based on amplitude data $A_i(L)$ and amplitude data $A_i(L-\delta d)$, which are two points separated by δd at the same azimuth angle. Therefore, the first-order differential $d_L A_i(L)$ is expressed as in Formula (6).

[Formula (6)]

$$d_L A_i(L) = \frac{A_i(L) - A_i(L - \delta d)}{\delta d} \quad (6)$$

Similarly, in step S120, the second change amount calculator 120 calculates a second-order differential based on the first-order differentials $d_L A_i(L)$ and $d_L A_i(L-\delta d)$, which are two points separated by 8d at the same azimuth angle. Therefore, the second-order differential $d_L^2 A_i(L)$ is expressed as in Formula (7).

[Formula (7)]

$$d_L^2 A_i(L) = \frac{d_L A_i(L) - d_L A_i(L - \delta d)}{\delta d} \quad (7)$$

The displacement of the received signal pattern with respect to distance, and the amount of change in the displacement of the received signal pattern do not necessarily coincide with that with respect to the angle direction. The reception pattern in the distance direction preferably emphasizes the position where the received signal begins to rise, and therefore differs from processing in the angle direction in the following respects. When the first coefficient setting component 131 sets the first coefficient, the first coefficient setting component 131 should set a high value (a value greater than 1, such as 2) as the first coefficient in the region in which the first-order differential $d_L A_i(L)$ in the distance direction is slightly greater than zero (that is, in the region where the signal begins to rise). To prevent a decrease in the S/N ratio before and after processing, in a region where the first-order differential $d_L A_i(L)$ in the distance direction is close to zero (that is, a region close to the peak of the signal), the first coefficient setting component 131 should set the first coefficient to 1. Furthermore, to make the signal fall off sharply for improving the distance resolution, in a region where the first-order differential $d_L A_i(L)$ in the distance direction is negative (that is, a region where the signal is falling), the first coefficient setting component 131 should set the first coefficient to a low value (such as a value of 0.1 or less). When the second-order differential $d_L^2 A_i(L)$ in the distance direction is close to zero, the second coefficient setting component 132 should set the second coefficient to 1. Conversely, when the second-order differential $d_L^2 A_i(L)$ in the distance direction is farther away from zero, the second coefficient setting component 132 should set the second coefficient to zero.

Next, the effect of this embodiment will be described. The target finder of this embodiment suppresses side lobes near the main lobe with a second-order differential coefficient, and also suppresses tailing of the main lobe with first-order differential and second-order differential coefficients.

The first change amount calculator 110 need only hold two sets of amplitude data that are adjacent in the angle direction or the distance direction, and the second change amount calculator 120 need only hold two first-order differentials that are adjacent in the angle direction or the distance direction. Therefore, the memory capacity can be smaller than with conventional filtering.

If the first-order differential and second-order differential are close to zero, the first coefficient and second coefficient will be 1, so there will be no reduction in the level of the peak value of the main lobe. This prevents a decrease in the S/N ratio at the main lobe.

Second Embodiment

In the first embodiment, a target finder was described that was equipped with a high resolution processing device that performed high resolution processing in either the angle direction or the distance direction. The target finder pertaining to the second embodiment performs high resolution processing in both the angle direction and the distance direction. The target finder pertaining to the second embodiment of the present invention will be described through reference to the drawings. Again in this embodiment a radar device will be described as an example of a target finder.

Figure 7:
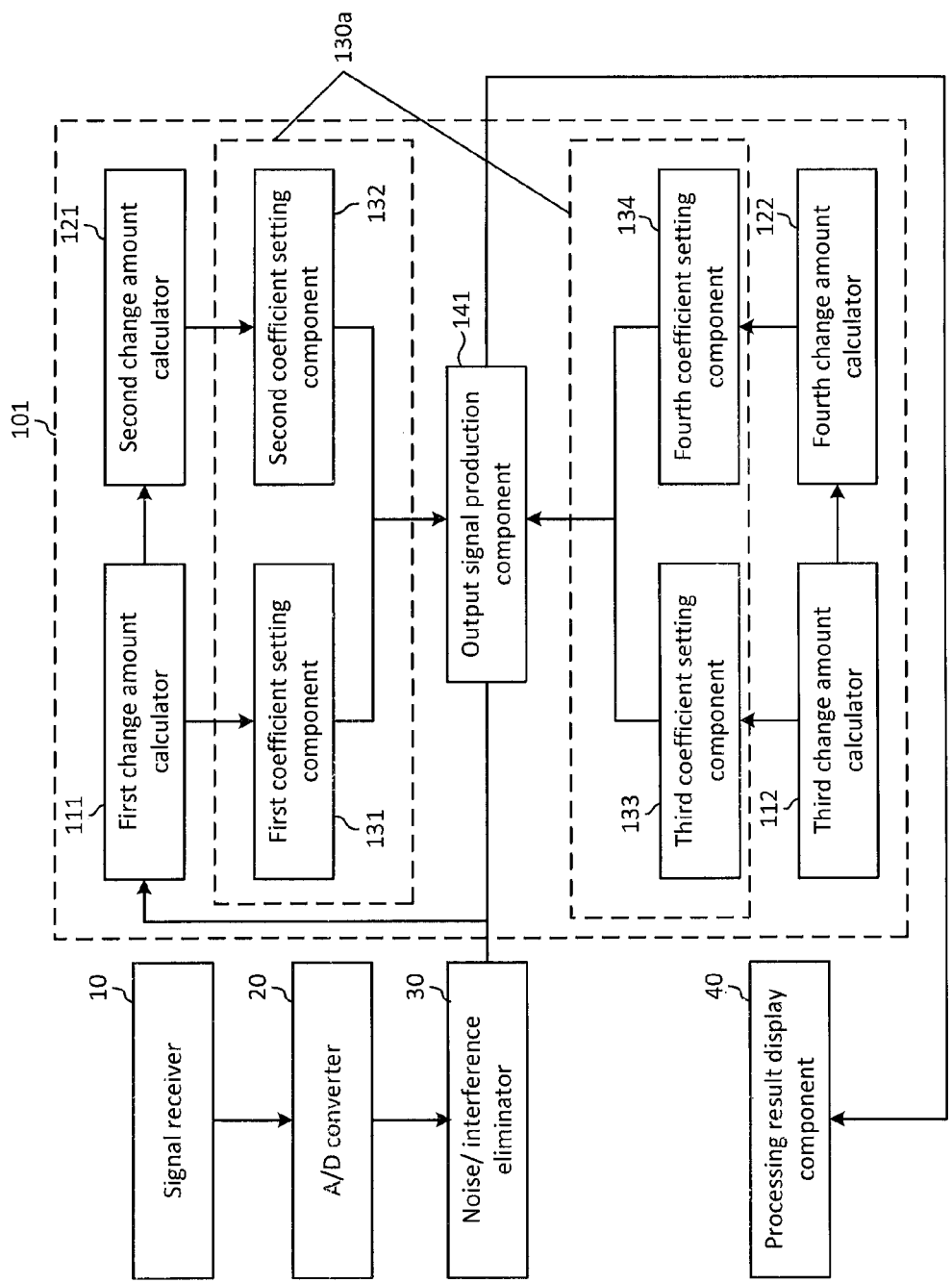
FIG. 7 is a simplified block diagram of the configuration of a radar device equipped with the high resolution processing device pertaining to a second embodiment of the present invention.

FIG. 7 is a simplified block diagram of the configuration of a radar device equipped with the high resolution processing device of this embodiment. This radar device includes a signal receiver 10, an A/D converter 20, a noise/interference eliminator 30, a high resolution processing device 101, and a processing result display component 40. The high resolution processing device 101 includes a first change amount calculator 111, a second change amount calculator 121, a third change amount calculator 112, a fourth change amount calculator 122, a coefficient setting component 130a, and an output signal production component 141. The coefficient setting component 130a includes a first coefficient setting component 131, a second coefficient setting component 132, a third coefficient setting component 133, and a fourth coefficient setting component 134. Those constituent elements that perform the same operation as in the first embodiment are numbered the same here, and will not be described again.

The first change amount calculator 111 executes the processing of Formula (1) in the first embodiment by performing first-order differentiation in the angle direction. The second change amount calculator 121 executes the processing of Formula (2) in the first embodiment by performing second-order differentiation in the angle direction. The third change amount calculator 112 executes the processing of Formula (6) in the first embodiment by performing first-order differentiation in the distance direction. The fourth change amount calculator 122 executes the processing of Formula (7) in the first embodiment by performing second-order differentiation in the distance direction.

The coefficient setting component 130a sets at least one coefficient based on the first to fourth change amounts. More specifically, the first coefficient setting component 131 and second coefficient setting component 132 belonging to the coefficient setting component 130 perform the same operations as in the first embodiment, and the third coefficient setting component 133 and the fourth coefficient setting component 134 perform the following operations.

The third coefficient setting component 133 sets a third coefficient based on a first-order differential for the distance direction, depending on to which of a predetermined plurality of third classifications the first-order differential belongs. This third classification is set according to the characteristics of the transmission pulse, just as is the first classification. The processing by the third coefficient setting component 133 is the same as the processing by the first coefficient setting component 131 when performing high resolution processing in the distance direction in the first embodiment.

The fourth coefficient setting component 134 sets a fourth coefficient based on a second-order differential for the distance direction, depending on to which of a predetermined plurality of fourth classifications the second-order differential belongs. This fourth classification is set according to the characteristics of the transmission pulse, just as is the second classification. The processing by the fourth coefficient setting component 134 is the same as the processing by the second coefficient setting component 132 when performing high resolution processing in the distance direction in the first embodiment.

An output signal production component 151 performs computation corresponding to multiplying the received signal by the above-mentioned first coefficient; second coefficient, third coefficient, and fourth coefficient, thereby producing an output signal, and outputs the output signal thus produced to the processing result display component 40.

Figure 8:
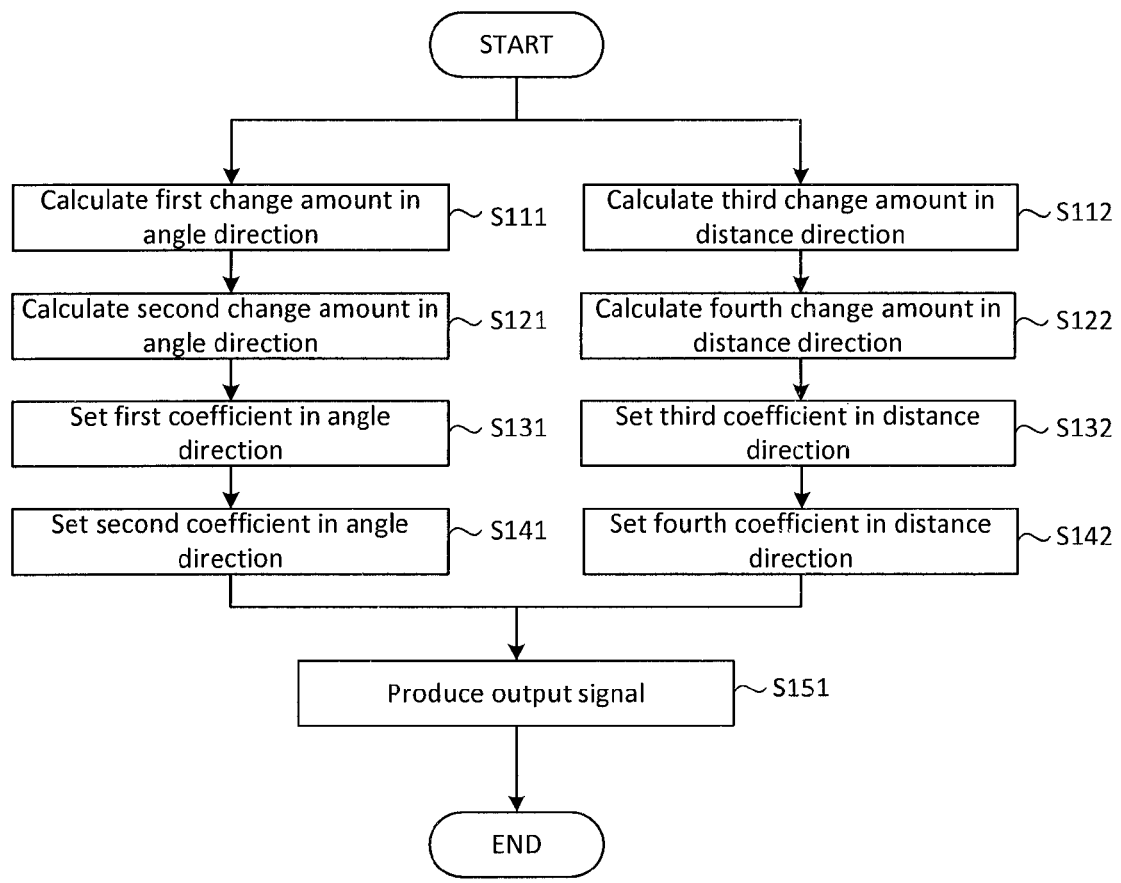
FIG. 8 is a flowchart showing the flow of processing in the high resolution processing device pertaining to the second embodiment.

Next, the operation of the high resolution processing device 101 in this embodiment will be described in detail through reference to the drawings. FIG. 8 is a flowchart showing the flow of processing in the high resolution processing device 101.

Steps S111 to S141 are the same as steps S110 to S140 in FIG. 2. In step S1112, the third change amount calculator 112 calculates the first-order differential $d_L A_i(L)$ from Formula (6) based on amplitude data $A_i(L)$ and $A_i(L-\delta d)$, which are two points separated by $\delta d$ at the same azimuth angle.

In step S122, the fourth change amount calculator 122 calculates the second-order differential $d_L^2 A_i(L)$ from Formula (7) based on the first-order differentials $A_i(L)$ and $A_i(L-\delta d)$, which are two points separated by $\delta d$ at the same azimuth angle.

In step S132, the third coefficient setting component 133 sets the third coefficient $R_i(L)$ based on the first-order differential for the distance direction, depending on to which of a predetermined plurality of third classifications the first-order differential belongs.

In step S142, the fourth coefficient setting component 134 sets the fourth coefficient $S_i(L)$ based on the second-order differential for the distance direction, depending on to which of a predetermined plurality of fourth classifications the second-order differential belongs.

Finally, in step S151, the output signal production component 151 produces an output signal $OOA_1(L)$ from the product of an output signal $OA_i(L)$ expressed by Formula (5), the third coefficient $R_i(L)$, and the fourth coefficient $S_i(L)$. $OOA_i(L)$ is expressed as in Formula (8). Formula (8) is premised on the fact that the input signal $A_{i-1}(L)$ is an anti-logarithmic value. If the input signal $A_i(L)$ is a logarithmic value, then addition processing should be performed instead of Formula (9). If the input signal $A_{i-1}(L)$ is digital data, then bit computation can be performed instead of Formula (8).

[Formula (8)]

$$OOA_i(L)=OA_i(L) \cdot R_i(L) \cdot S_i(L)= A_{i-1}(L) \cdot P_i(L) \cdot Q_i(L) \cdot R_i(L) \cdot S_i(L) \quad (8)$$

The above is the operation of the high resolution processing device 101 in this embodiment. However, in this embodiment the processing content of {the first change amount calculator, the second change amount calculator, the first coefficient processor, and the second coefficient processor} can be switched with the processing content of {the third change amount calculator, the fourth change amount calculator, the third coefficient processor, and the fourth coefficient processor}. That is, {the first change amount calculator, the second change amount calculator, the first coefficient processor, and the second coefficient processor} can perform first-order differentiation and second-order differentiation for the distance direction, and set the first coefficient and second coefficient. Also, {the third change amount calculator, the fourth change amount calculator, the third coefficient processor, and the fourth coefficient processor} can perform first-order differentiation and second-order differentiation for the angle direction, and set the third coefficient and fourth coefficient. In FIG. 8, the order of the processing in step S121 and the processing in step S131 can be switched around. Similarly, the order of the processing in step S122 and step S132 can be switched around. That is, the first coefficient setting component 131 can first set the first coefficient, and then the second change amount calculator 121 can perform second-order differentiation. Also, the third coefficient setting component 133 can first set the third coefficient, and then the fourth change amount calculator 122 can perform second-order differentiation.

Next, the effect of this embodiment will be described. The target finder in this embodiment suppresses side lobes near the main lobe for the angle direction, and also suppresses tailing of the main lobe in both the distance direction and the angle direction.

Third Embodiment

In the first and second embodiments, the first and second coefficients were set from the first and second change amounts, respectively, and the output signal production component performed computation corresponding to multiplying the first and second coefficients by the anti-logarithmic value of the input signal. However, not only does this require a memory region for storing the first and second coefficients, but there is also the possibility that the first and second coefficients will have values that cancel each other out, so that the desired effect is not obtained. In view of this, with the target finder pertaining to the third embodiment, this problem is avoided by setting one coefficient that is multiplied by the anti-logarithmic value of the input signal from the combination of the first and second change amounts. The target finder pertaining to the third embodiment of the present invention will now be described through reference to the drawings. Again in this embodiment, a radar device is described as an example of a target finder.

Figure 9:
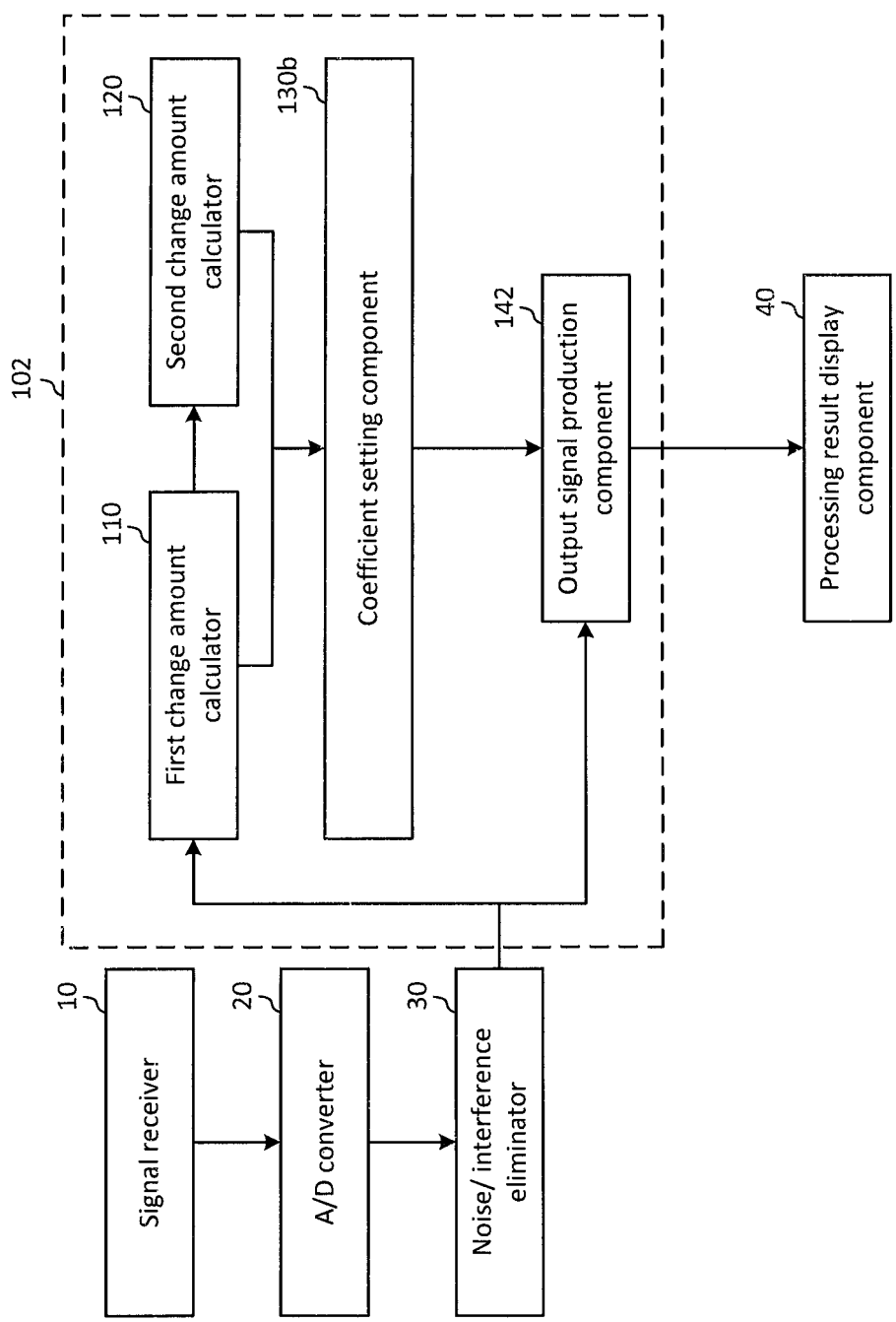
FIG. 9 is a simplified block diagram of the configuration of a radar device equipped with the high resolution processing device pertaining to a third embodiment of the present invention.

FIG. 9 is a simplified block diagram of the configuration of a radar device including a high resolution processing device in this embodiment. This radar device includes a signal receiver 10, an A/D converter 20, a noise/interference eliminator 30, a high resolution processing device 102, and a processing result display component 40. The high resolution processing device 102 includes a first change amount calculator 110, a second change amount calculator 120, a coefficient setting component 130b, and an output signal production component 142. Those constituent elements that perform the same operation as in the first embodiment are numbered the same here, and will not be described again.

The coefficient setting component 130b determines to which of a predetermined plurality of first and second classifications the first and second change amounts belong based on the combination of the first change amount and the second change amount. The coefficient setting component 130b also sets one coefficient based on the determined first and second classifications. The operation of the coefficient setting component 130b will be discussed in detail below.

The output signal production component 140 produces an output signal by performing computation corresponding to multiplying the one coefficient set by the coefficient setting component 130b by the anti-logarithmic value of the received signal. The output signal production component 140 then outputs the produced output signal to the processing result display component 40.

Figure 10:
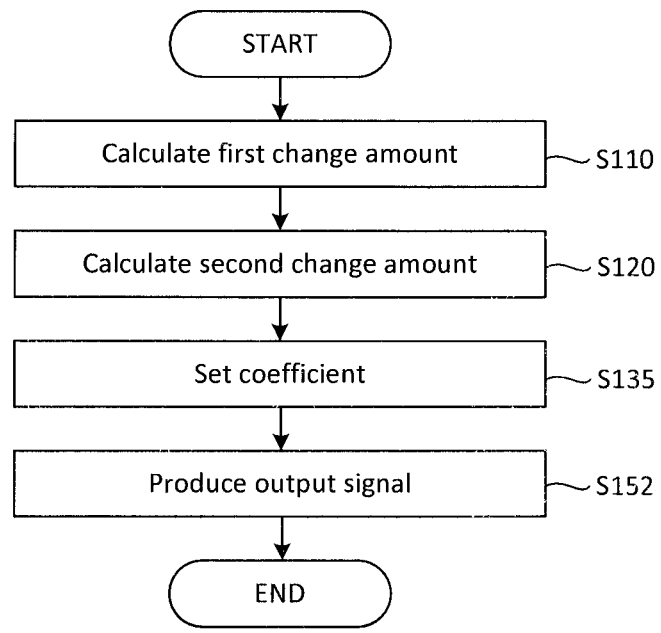
FIG. 10 is a flowchart showing the flow of processing in the high resolution processing device pertaining to the third embodiment.

The operation of the high resolution processing device 102 in this embodiment will now be described in detail through reference to FIG. 10. The description is premised on the fact that this radar device receives the signal pattern shown in FIG. 3, and an example in which high resolution processing is performed in the angle direction will be described. Processing that is the same as in FIG. 2 is numbered the same in FIG. 10 and will not be described again.

Up to step S120 in FIG. 10, the first change amount (first-order differential) $d_1 = d_\theta A_i(L)$ and the second change amount (second-order differential) $d_2 = d_\theta^2 Ai(L)$ are found from Formulas 1 and 2, after which the coefficient setting component 130b in step S135 sets the coefficient $X_i(L)$ to be multiplied with the anti-logarithmic value of the input signal according to Table 1 below from the combination of the first change amount $d_1$ and the second change amount $d_2$.

Finally, in step S152 the output signal production component 150 produces an output signal $OA_i(L)$ from the product of the input signal $A_{i-1}(L)$ and the coefficient $X_i(L)$. $OA_i(L)$ is expressed as in Formula (9). Formula (9) is premised on the fact that the input signal $A_{i-1}(L)$ is an anti-logarithmic value. If the input signal $A_{i-1}(L)$ is a logarithmic value, then addition processing should be performed instead of Formula (9). If the input signal $A_{i-1}(L)$ is digital data, bit computation should be performed instead of Formula (9).

[Formula (9)]

$$OA_i(L) = A_{i-1}(L) \cdot X_i(L) \qquad (9)$$

Referring to Table 1, in the area of the main lobe of the signal ($-2 < d_1 \leq 2$, and $-6 < d_2 \leq 1$), the coefficient setting component 130b sets a coefficient of 1 so that the S/N ratios before and after processing will match up. The farther away the main lobe of the signal is, the lower is the value of the coefficient set by the coefficient setting component 130b. This makes it possible to suppress side lobes and tailing of the main lobe, and to prevent a decrease in the S/N ratio before and after processing. In the ranges of $-2 < d_1 \leq 2$ and $1 < d_2 \leq 3$, the reason for setting the coefficient to 0.001 is that these ranges often coincide with valleys between targets, and the signal has to be suppressed to improve differentiation between targets.

The operation of the high resolution processing device 102 in this embodiment was described above for a case in which high resolution processing was performed for the angle direction. When it is performed for the distance direction, the first change amount (first-order differential) $d_1 = d_L A_i(L)$ and the second change amount (second-order differential) $d_2 = d_L^2 Ai(L)$ should be calculated from Formulas 6 and 7, after which the coefficient setting component 130b should set the coefficient $X_i(L)$ to be multiplied with the anti-logarithmic value of the input signal according to Table 2 below from the combination of the first change amount $d_1$ and the second change amount $d_2$.

TABLE 1

| | | Range of first change amount (first-order differential) $d_1$ | | | | | | |
|---|---|---|---|---|---|---|---|---|
| | | $d_1 \leq -8$ | $-8 < d_1 \leq -5$ | $-5 < d_1 \leq -2$ | $-2 < d_1 \leq 2$ | $2 < d_1 \leq 5$ | $5 < d_1 \leq 8$ | $8 < d_1$ |
| Range of second change amount (second-order differential) $d_2$ | $d_2 \leq -6$ | 0.001 | 0.001 | 0.001 | 0.001 | 0.001 | 0.001 | 0.001 |
| | $-6 < d_2 \leq 1$ | 0.001 | 0.1 | 0.5 | 1 | 0.5 | 0.1 | 0.001 |
| | $1 < d_2 \leq 3$ | 0.001 | 0.1 | 0.5 | 0.001 | 0.5 | 0.1 | 0.001 |
| | $3 < d_2$ | 0.001 | 0.001 | 0.001 | 0.001 | 0.001 | 0.001 | 0.001 |

TABLE 2

| | | Range of first change amount (first-order differential) $d_1$ | | | | | | |
|---|---|---|---|---|---|---|---|---|
| | | $d_1 \le -10$ | $-10 < d_1 \le -4$ | $-4 < d_1 \le -2$ | $-2 < d_1 \le 2$ | $2 < d_1 \le 4$ | $4 < d_1 \le 10$ | $10 < d_1$ |
| Range of second change amount (second-order differential) $d_2$ | $d_2 \le -15$ | 0.001 | 0.001 | 0.001 | 0.001 | 0.001 | 0.001 | 0.001 |
| | $-15 < d_2 \le -4.2$ | 0.001 | 0.001 | 0.001 | 0.1 | 0.001 | 0.001 | 0.001 |
| | $-4.2 < d_2 \le -0.5$ | 0.001 | 0.001 | 0.001 | 0.5 | 0.001 | 0.001 | 0.001 |
| | $-0.5 < d_2 \le 1$ | 0.001 | 0.001 | 0.001 | 1 | 1.5 | 1.5 | 0.001 |
| | $1 < d_2 \le 2$ | 0.001 | 0.001 | 0.001 | 1 | 2 | 2 | 0.001 |
| | $2 < d_2 \le 5$ | 0.001 | 0.001 | 0.001 | 1 | 2 | 2 | 0.001 |
| | $5 < d_2$ | 0.001 | 0.001 | 0.001 | 0.001 | 0.001 | 0.001 | 0.001 |

If this method is used, the coefficient setting component 130b sets the coefficient to a high value (2) in the regions where the signal begins to rise in the distance direction ($2 < d_1 \le 10$ and $1 < d_2 \le 5$). Also, in the areas of the peak of the signal ($-2 < d_1 \le 2$ and $-0.5 < d_2 \le 5$), the coefficient setting component 130b sets the coefficient to 1 so that the S/N ratios before and after processing will match up. To improve distance resolution, in the area where the signal is falling ($d_1 \le -2$) the coefficient setting component 130b sets the coefficient to 0.001 so that the signal will fall off sharply.

Fourth Embodiment

The coefficients in Tables 1 and 2 in the third embodiment are premised on the fact that processing in the distance direction is independent from processing in the angle direction. Therefore, when the first to fourth change amounts are used collectively, if the high resolution processing device produces an output signal by performing processing corresponding to multiplying each coefficient as in the second embodiment, there is also the possibility that the coefficients for the distance direction and the angle direction will have values that cancel each other out, so that the desired effect is not obtained. In view of this, with the target finder pertaining to the fourth embodiment, this problem is avoided by setting one coefficient that is multiplied by the anti-logarithmic value of the input signal from the combination of the first to fourth change amounts. The target finder pertaining to the fourth embodiment of the present invention will now be described through reference to the drawings. Again in this embodiment, a radar device is described as an example of a target finder.

Figure 11:
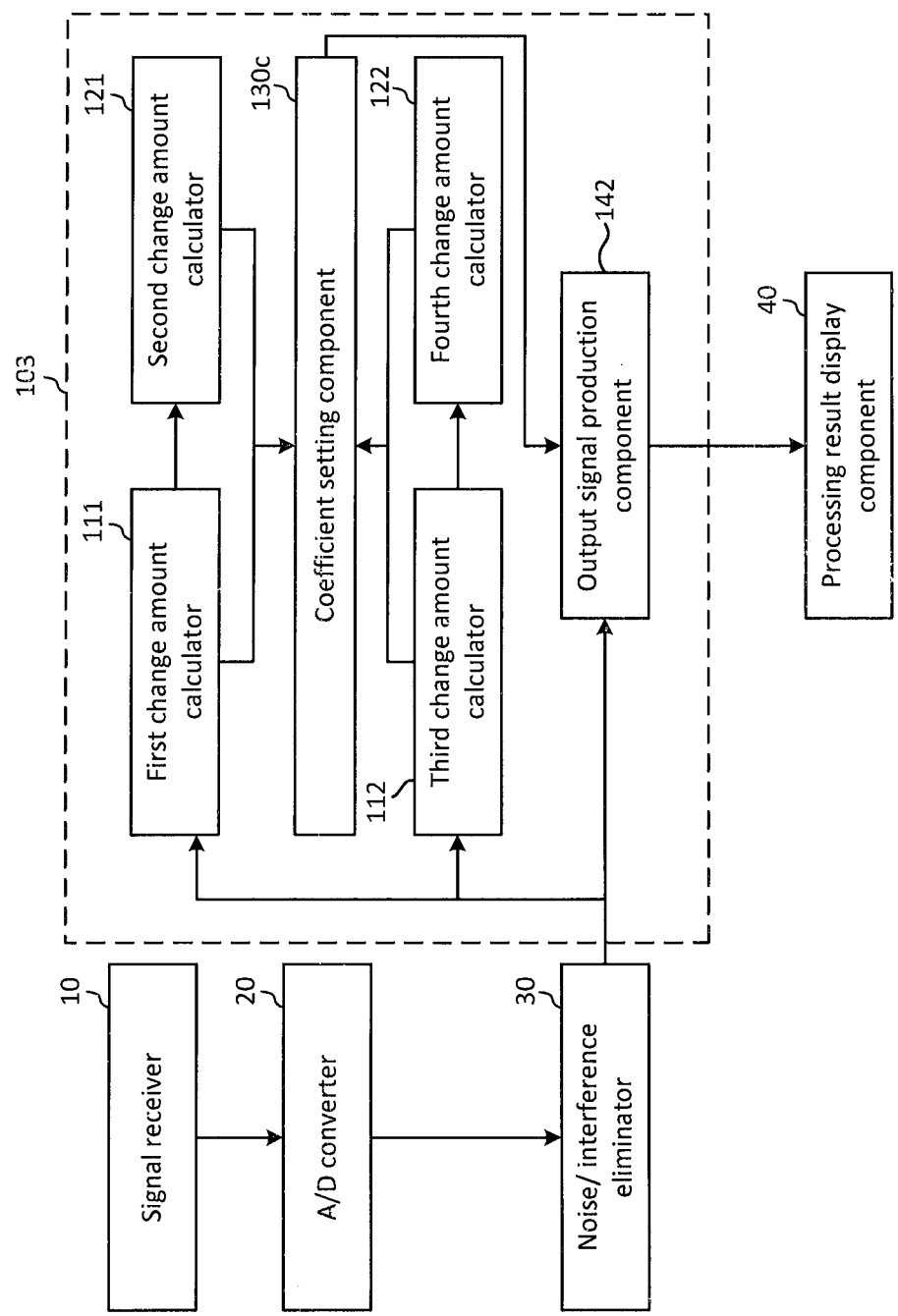
FIG. 11 is a simplified block diagram of the configuration of a radar device equipped with the high resolution processing device pertaining to a fourth embodiment of the present invention.

FIG. 11 is a simplified block diagram of the configuration of a radar device equipped with a high resolution processing device in this embodiment. This radar device includes a signal receiver 10, an A/D converter 20, a noise/interference eliminator 30, a high resolution processing device 103, and a processing result display component 40. The high resolution processing device 103 includes a first change amount calculator 111, a second change amount calculator 121, a third change amount calculator 112, a fourth change amount calculator 122, a coefficient setting component 130c, and an output signal production component 142. Those constituent elements that perform the same operation as in the second and third embodiments are numbered the same here, and will not be described again.

The coefficient setting component 130c determines to which of a predetermined plurality of first to fourth classifications the first to fourth change amounts respectively belong, based on the combination of the first to fourth change amounts. The coefficient setting component 130c then sets one coefficient based on the determined first to fourth classifications. The operation of the coefficient setting component 130c will be discussed in detail below.

Figure 12:
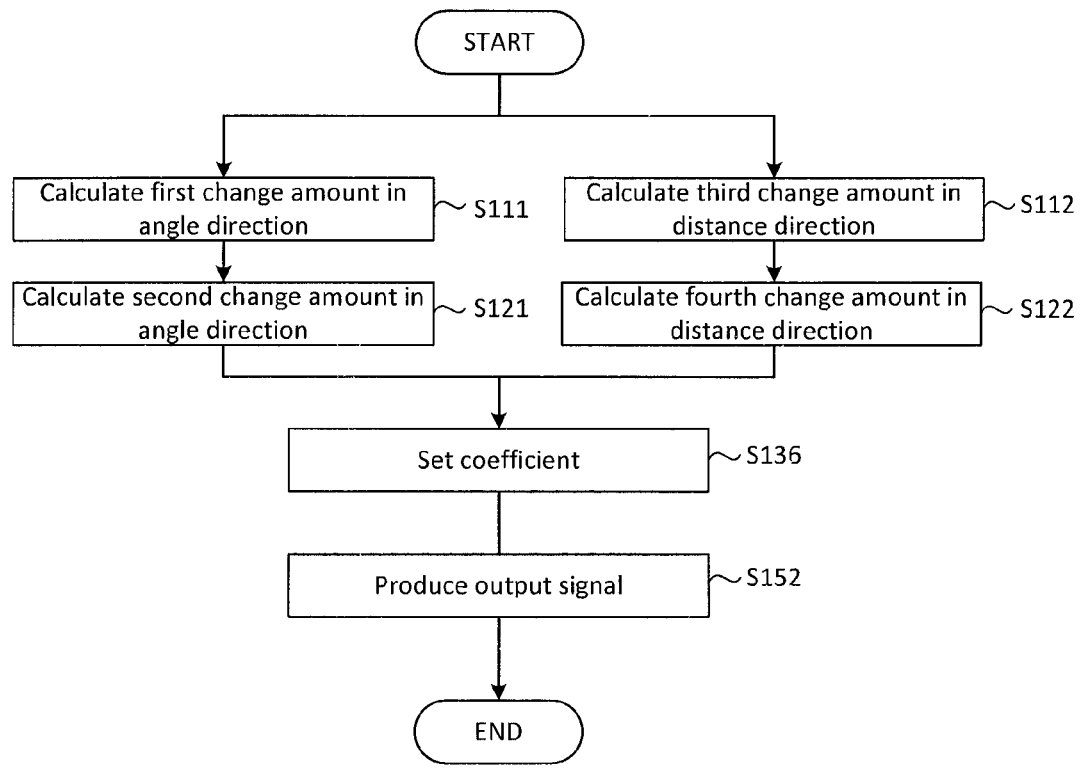
FIG. 12 is a flowchart showing the flow of processing in the high resolution processing device pertaining to the fourth embodiment.

Next, the operation of the high resolution processing device 103 in this embodiment will be described in detail through reference to FIG. 12. The description is premised on the fact that this radar device receives the signal pattern shown in FIG. 3, and an example in which high resolution processing is performed in the angle direction will be described. Processing that is the same as in FIGS. 8 and 10 is numbered the same in FIG. 12 and will not be described again.

In steps S111, 112, 121, and 122, the first change amount $d_1 = d_\theta A_i(L)$, the second change amount $d_2 = d_\theta^2 A_i(L)$, the third change amount $d_3 = d_L A_i(L)$, and the fourth change amount $d_4 = d_L^2 A_i(L)$ are found, and then in step S136 the coefficient setting component 130c selects the areas in the angle direction and distance direction based on Tables 3 and 4. The numerical values in Tables 3 and 4 are identifiers for Area(A) and Area(R), which are used to distinguish between areas.

TABLE 3

| | | Range of first change amount (first-order differential) $d_1$ | | | | | | | |
|---|---|---|---|---|---|---|---|---|---|
| | | $d_1 \le -8$ | $-8 < d_1 \le -5$ | $-5 < d_1 \le -2$ | $-2 < d_1 \le 2$ | $2 < d_1 \le 5$ | $5 < d_1 \le 8$ | $8 < d_1$ |
| Range of second change amount (second-order differential) $d_2$ | $d_2 \le -6$ | 4 | 4 | 4 | 4 | 4 | 4 | 4 |
| | $-6 < d_2 \le 1$ | 4 | 3 | 2 | 1 | 2 | 3 | 4 |

TABLE 3-continued

| | | Range of first change amount (first-order differential) $d_1$ | | | | | |
|---|---|---|---|---|---|---|---|
| | | $d_1 \leq -8$ | $-8 < d_1 \leq -5$ | $-5 < d_1 \leq -2$ | $-2 < d_1 \leq 2$ | $2 < d_1 \leq 5$ | $5 < d_1 \leq 8$ | $8 < d_1$ |
| | $1 < d_2 \leq 3$ | 4 | 3 | 2 | 4 | 2 | 3 | 4 |
| | $3 < d_2$ | 4 | 4 | 4 | 4 | 4 | 4 | 4 |

TABLE 4

| | | Range of third change amount (first-order differential) $d_3$ | | | | | | |
|---|---|---|---|---|---|---|---|---|
| | | $d_3 \leq -1.5$ | $-1.5 < d_3 \leq -1$ | $-1 < d_3 \leq -0.5$ | $-0.5 < d_3 \leq 0.7$ | $0.7 < d_3 \leq 1$ | $1 < d_3 \leq 2$ | $2 < d_3$ |
| Range of fourth change amount (second-order differential) $d_4$ | $d_4 \leq -0.3$ | 6 | 6 | 6 | 6 | 6 | 6 | 6 |
| | $-0.3 < d_4 \leq -0.25$ | 6 | 6 | 6 | 5 | 6 | 6 | 6 |
| | $-0.25 < d_4 \leq -0.15$ | 6 | 6 | 6 | 4 | 6 | 6 | 6 |
| | $-0.15 < d_4 \leq 0.1$ | 6 | 6 | 6 | 3 | 2 | 2 | 6 |
| | $0.1 < d_4 \leq 0.2$ | 6 | 6 | 6 | 3 | 1 | 1 | 6 |
| | $0.2 < d_4 \leq 1$ | 6 | 6 | 6 | 3 | 1 | 1 | 6 |
| | $1 < d_4$ | 6 | 6 | 6 | 6 | 6 | 6 | 6 |

Figure 13:
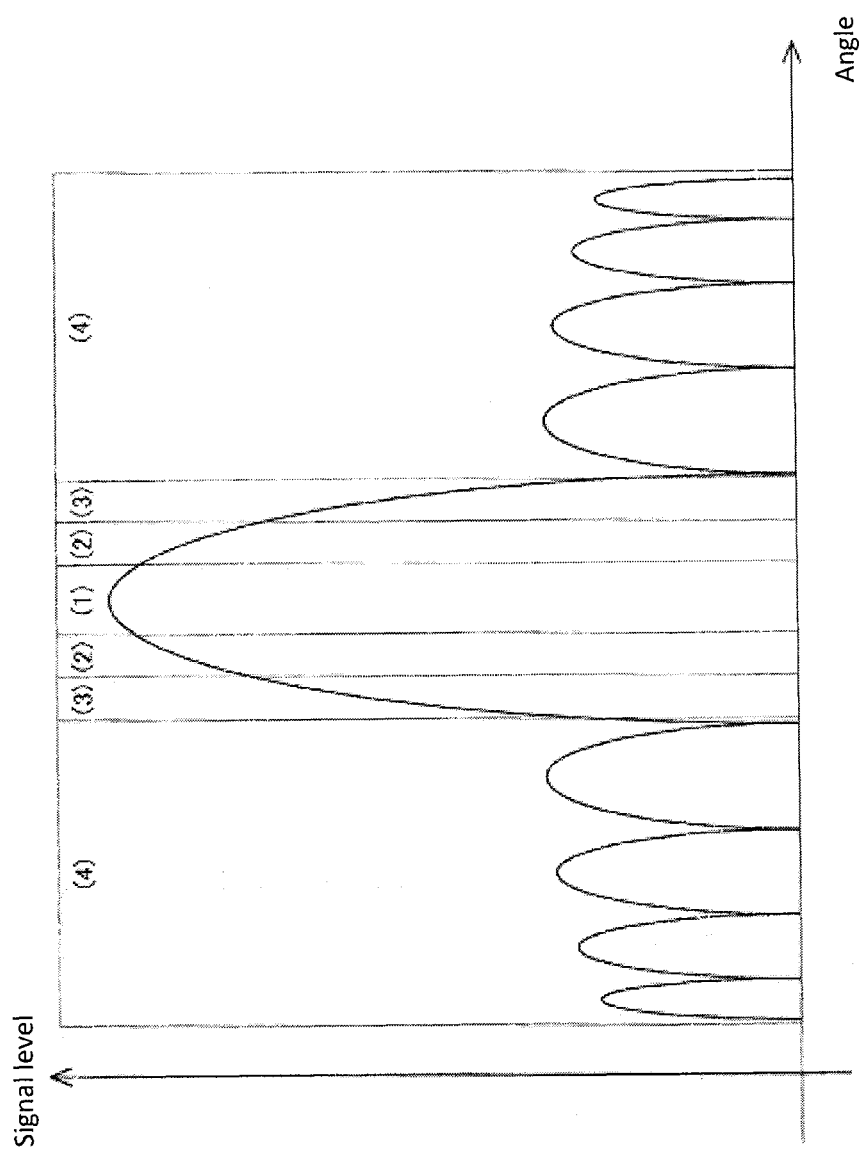
FIG. 13 is a diagram illustrating an example of the area in the angle direction.

FIG. 13 shows the area of the received signal corresponding to Area(A) in Table 1. The numbers in parentheses in FIG. 13 are for Area(A). Referring to FIG. 13, when Area(A)={1, 2, 3, 4}, it can be seen that Area(A) expresses {the main lobe, tailing near the center of the main lobe, tailing far from the center of the main lobe, and valleys between targets, noise, and side lobes}.

Figure 14:
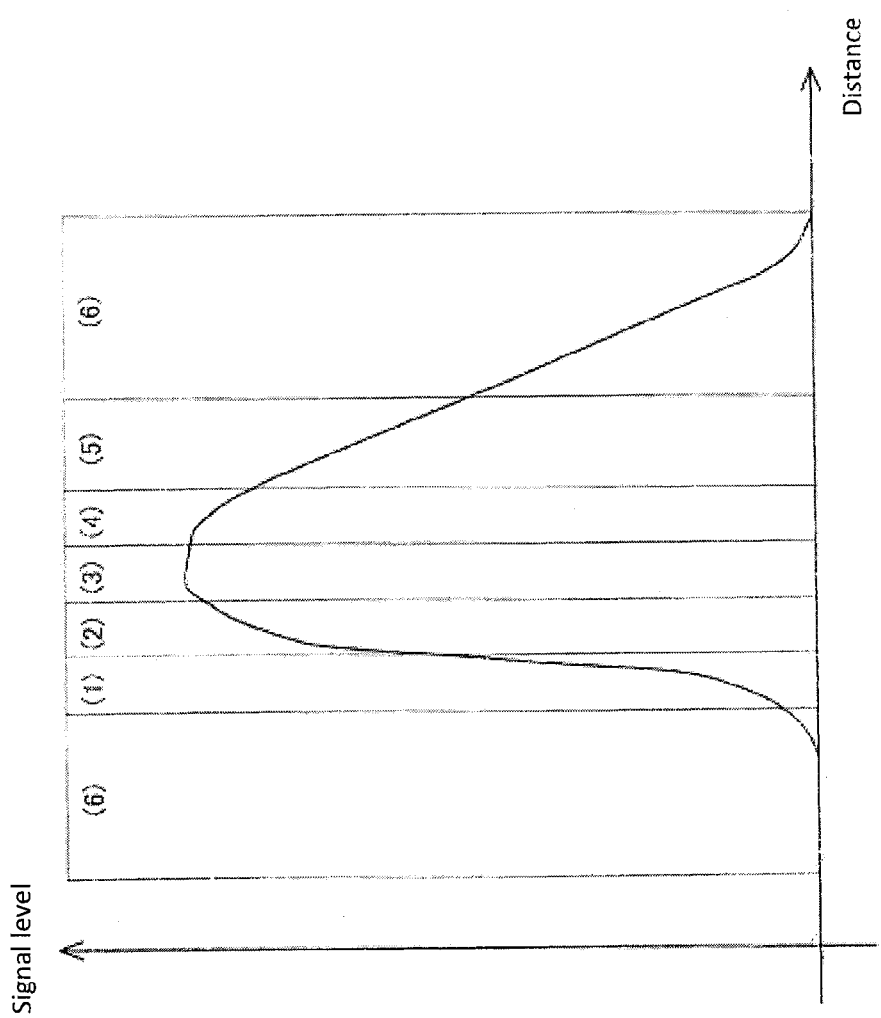
FIG. 14 is a diagram illustrating an example of the area in the distance direction.

FIG. 14 shows the position of the received signal corresponding to Area(R) in Table 2. The numbers in parentheses in FIG. 14 are for Area(R). Referring to FIG. 14, when Area(R)={1, 2, 3, 4, 5, 6}, it can be seen that Area(R) expresses {the start of the rise, the rise, the peak, the start of the fall, the fall, and valleys between targets, noise, and side lobes}.

After this, the coefficient setting component 130c sets the coefficient $X_i(L)$ as in Table 5, based on Area(A) and Area(R) found by area selection.

TABLE 5

| | | Area (R) | | | | | |
|---|---|---|---|---|---|---|---|
| | | 1 | 2 | 3 | 4 | 5 | 6 |
| Area (A) | 1 | 2.0 | 1.5 | 1.2 | 0.5 | 0.1 | 0.001 |
| | 2 | 0.5 | 0.5 | 0.5 | 0.5 | 0.1 | 0.001 |
| | 3 | 0.1 | 0.1 | 0.1 | 0.1 | 0.1 | 0.001 |
| | 4 | 0.001 | 0.001 | 0.001 | 0.001 | 0.001 | 0.001 |

Using this method, in the area of the main lobe in the angle direction and at the start of the rise of the signal in the distance direction (Area(A)=Area(R)=1), the coefficient setting component 130c sets the coefficient to a high value (2). Consequently, the signal is strengthened in the area of the main lobe and at the start of the rise. The farther away from the main lobe, the lower the value is for the coefficient set by the coefficient setting component 130c in the order of start of the rise→rise→peak→start of the fall→fall. In an area of the valleys between targets, noise, and side lobes (Area(A)=4 or Area(R)=6), the coefficient setting component 130c sets the coefficient to the minimum value (0.001). Consequently, the signal is strongly suppressed in an area of valleys between targets, noise, and side lobes. Consequently, the signal processing device in this embodiment produces a signal of high resolution.

The first classification, second classification, third classification, and fourth classification were used in the first to fourth embodiments, but the more classifications there are, the smoother the final output signal will be. It is preferable for there to be at least three of these classifications.

The radar signal is inputted in an R-θ coordinate system composed of an orientation θ and a distance R, but when the signal is plotted on a screen, it is converted into an XY coordinate system, which is a perpendicular coordinate system. Therefore, the distribution is dense for signals of short distance, and sparse for signals of long distance. Accordingly, the shorter the distance, the more a radar image is compressed in the angle direction, and the longer the distance, the more the image is expanded. Because high resolution processing is processing that reduces a signal in the angle direction, a signal of short distance is smaller and harder to see. In view of this, processing for short distance should be weakened by changing the coefficient of high resolution processing according to the distance.

More specifically, the coefficients in Tables 1 to 4 and Formulas 3 and 4 should be set so as to increase as L in the amplitude data AA) at a distance L from the antenna become smaller. Alternatively, the range over which the coefficients in Tables 1 to 5 and Formulas 3 and 4 are set should be made broader overall, that is, using the range in which the values of the coefficients are at their maximum as a reference, a smaller range should be designated for ranges smaller than this, and a larger range designated for ranges that are larger than this.

WORKING EXAMPLES

Some or all of the function blocks pertaining to the embodiments given above are realized by using a CPU to interpret and execute program data that can execute the above processing procedure and that is stored in a memory device (such as a ROM, RAM, or hard disk). In this case, the program data can be introduced into the memory device via a recording medium, or can be directly executed from the recording medium. The term "recording medium" here refers to a semiconductor memory such as a flash memory, a RAM, or a ROM, a magnetic disk memory such as a hard disk or a flexible disk, an optical memory such as a CD-ROM, a DVD, or a BD, a memory card, or the like. Also, "recording medium" is a concept that also encompasses a communication medium such as a telephone line or a conveyance path.

Some or all of the function blocks pertaining to the embodiments given above are typically realized as an integrated circuit (variously called an IC, system LSI, super LSI, ultra. LSI, or the like, depending on the degree of integration). These can individually be made into a chip, or some or all of them can be made into a single chip. The method for circuit integration is not limited to LSI, and can be realized by a dedicated circuit or a multipurpose processor. It, is also possible to use an FPGA (field programmable gate array) that can be programmed after manufacture of the integrated circuit, or a reconfigurable processor that allows reconfiguration of settings or connections in circuit cells in the integrated circuit interior.

Applications of the Embodiments

The above embodiments were described using a radar device as an example of a target finder, but can similarly be applied to a sonar device. When applied to a sonar device, the concept corresponding to the distance mention in the present invention can include water depth or time.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A target finder for detecting a presence of a target, the target finder apparatus comprising:
    a receiver configured to receive a signal reflected from the target, the received signal including a main lobe and side lobes on opposite sides of the main lobe; and
    a high resolution processing device configured to increase resolution of the received signal received by the receiver, the high resolution processing device comprising:
        a first change amount calculator configured to control a processing device to calculate a first change amount representing an amount of change in the received signal in one direction of an angle direction and a distance direction;
        a second change amount calculator configured to control the processing device to calculate a second change amount representing an amount of change in the first change amount in the one direction;
        a coefficient setting component configured to control the processing device to set at least one coefficient based on the first change amount and the second change amount; and
        an output signal production component configured to control the processing device to perform computation corresponding to multiplying the at least one coefficient by an anti-logarithmic value of the received signal to suppress a tailing of the main lobe and the side lobes in accordance with the at least one coefficient to produce an output signal indicating the presence of the target.

2. The target finder according to claim 1, wherein
the coefficient setting component is further configured to control the processing device to determine to which of a plurality of predetermined first classifications the first change amount belongs, determine to which of a plurality of predetermined second classifications the second change amount belongs, and set the at least one coefficient based on the determined first classification and the determined second classification.

3. The target finder according to claim 2, further comprising
    a third change amount calculator configured to calculate a third change amount representing an amount of change in the received signal in the other direction of the angle direction and the distance direction, and
    a fourth change amount calculator configured to control the processing device to calculate a fourth change amount representing an amount of change in the third change amount in the other direction,
    the coefficient setting component being further configured to control the processing device to determine to which of a plurality of predetermined third classifications the third change amount belongs, determine to which of a plurality of predetermined fourth classifications the fourth change amount belongs, and set the at least one coefficient based on the determined first classification, the determined second classification, the determined third classification, and the determined fourth classification.

4. The target finder according to claim 3, wherein
the coefficient setting component is configured to control the processing device to set the at least one coefficient to a value that increases as a distance from the target finder becomes shorter when the determined third classification and the determined fourth classification are the same.

5. The target finder according to claim 2, wherein
the coefficient setting component is configured to control the processing device to set the at least one coefficient to a value that increases as a distance from the target finder becomes shorter when the determined first classification and the determined second classification are the same.

6. The target finder according to claim 2, wherein
the coefficient setting component is configured to control the processing device to set the at least one coefficient to a maximum value in the first classification corresponding to an area of the main lobe while the first change amount calculator calculates the first change amount representing the amount of change in the received signal in the angle direction.

7. The target finder according to claim 6, wherein
the coefficient setting component is configured to control the processing device to set the at least one coefficient to a maximum value in the second classification corresponding to the area of the main lobe while the second change amount calculator calculates the second change amount representing the amount of change in the first change amount in the angle direction.

8. The target finder according to claim 2, wherein
the coefficient setting component is configured to control the processing device to set the at least one coefficient to a maximum value in the first classification corresponding to an area where a signal in the distance direction begins to rise while the first change amount calculator calculates the first change amount representing the amount of change in the received signal in the distance direction.

9. The target finder according to claim 8, wherein
the coefficient setting component is configured to control the processing device to set the at least one coefficient to a maximum value in the second classification corresponding to an area where a signal in the distance direction begins to rise while the second change amount calculator calculates the second change amount representing the amount of change in the first change amount target finder in the distance direction.

10. The target finder according to claim 1, wherein
the coefficient setting component includes
a first coefficient setting component that is configured to control the processing device to set a first coefficient by determining to which of a plurality of predetermined first classifications the first change amount belongs, and
a second coefficient setting component that is configured to control the processing device to set a second coefficient by determining to which of a plurality of predetermined second classifications the second change amount belongs, and
the output signal production component is further configured to control the processing device to produce the output signal by performing computation corresponding to multiplying the first coefficient and the second coefficient by the anti-logarithmic value of the received signal.

11. The target finder according to claim 10, further comprising
a third change amount calculator configured to control the processing device to calculate a third change amount representing an amount of change in the received signal in the other direction of the angle direction and the distance direction, and
a fourth change amount calculator configured to control the processing device to calculate a fourth change amount representing an amount of change in the third change amount in the other direction,
the coefficient setting component further including
a third coefficient setting component that is configured to control the processing device to set a third coefficient by determining to which of a plurality of predetermined third classifications the third change amount belongs, and
a fourth coefficient setting component that is configured to control the processing device to set a fourth coefficient by determining to which of a plurality of predetermined fourth classifications the fourth change amount belongs, and
the output signal production component being further configured to control the processing device to produce another output signal by performing computation corresponding to further multiplying the third coefficient and the fourth coefficient by the anti-logarithmic value of the output signal.

12. The target finder according to claim 10, wherein
the first coefficient setting component is configured to control the processing device to set the first coefficient such that the first coefficient decreases as the first classification corresponds to an area farther away from a main lobe while the first change amount calculator calculates as the first change amount the amount of change in the received signal in the angle direction.

13. The target finder according to claim 10, wherein
the second coefficient setting component is configured to control the processing device to set the second coefficient to a minimum value when the second classification corresponds to a side lobe or noise while the second change amount calculator calculates as the second change amount the amount of change in the first change amount in the angle direction.

14. The target finder according to claim 10, wherein
the first coefficient setting component is configured to control the processing device to set the first coefficient such that the first coefficient decreases as a signal in the distance direction begins to rise, rises, peaks, begins to fall, and falls while the first change amount calculator calculates the first change amount representing the amount of change in the received signal in the distance direction.

15. The target finder according to claim 10, wherein
the second coefficient setting component is configured to control the processing device to set the second coefficient such that the second coefficient decreases as a signal in the distance direction begins to rise, rises, peaks, begins to fall, and falls while the second change amount calculator calculates the second change amount representing the amount of change in the first change amount in the distance direction.

16. The target finder according to claim 1, wherein
the amount of change in the received signal corresponds to a first-order differential of the received signal.

17. The target finder according to claim 1, wherein
the amount of change in the first change amount corresponds to a second-order differential of the received signal.

18. A target finder comprising:
a signal receiver configured to receive a signal reflected from a target;
an A/D converter configured to convert the received signal into a digital signal, the received signal including a main lobe and side lobes on opposite sides of the main lobe;

a noise/interference eliminator configured to eliminate noise and interference from the digital signal;

a first change amount calculator configured to calculate a first change amount representing an amount of change in the received signal in one direction of an angle direction and a distance direction with respect to the signal processed by the noise/interference eliminator;

a second change amount calculator configured to calculate a second change amount representing an amount of change in the first change amount in the one direction;

a coefficient setting component configured to set at least one coefficient based on the first change amount and the second change amount; and an output signal production component configured to perform computation corresponding to multiplying the at least one coefficient by an anti-logarithmic value of the received signal to suppress a tailing of the main lobe and the side lobes in accordance with the at least one coefficient to produce an output signal indicating the presence of the target.

19. The target finder according to claim 18, wherein the coefficient setting component is further configured to determine to which of a plurality of predetermined first classifications the first change amount belongs, determine to which of a plurality of predetermined second classifications the second change amount belongs, and set the at least one coefficient based on the determined first classification and the determined second classification.

20. A high resolution processing method for increasing resolution of a received signal received by a target finder that is configured to detect a presence of a target, the method comprising:

operating a receiver configured to receive a signal reflected from the target as the received signal, the received signal including a main lobe and side lobes on opposite sides of the main lobe operating a processing device to calculate a first change amount representing an amount of change in the received signal in one direction of an angle direction and a distance direction;

operating the processing device to calculate a second change amount representing an amount of change in the first change amount in the one direction;

operating the processing device to set at least one coefficient based on the first change amount and the second change amount; and operating the processing device to multiply the at least one coefficient by an anti-logarithmic value of the received signal to suppress a tailing of the main lobe and the side lobes in accordance with the at least one coefficient to produce an output signal indicating the presence of the target.

* * * * *